May 17, 1960   F. CONOVER   2,936,656
POWER TURRET FOR VERTICAL BORING MILL
Filed April 28, 1958   6 Sheets-Sheet 1
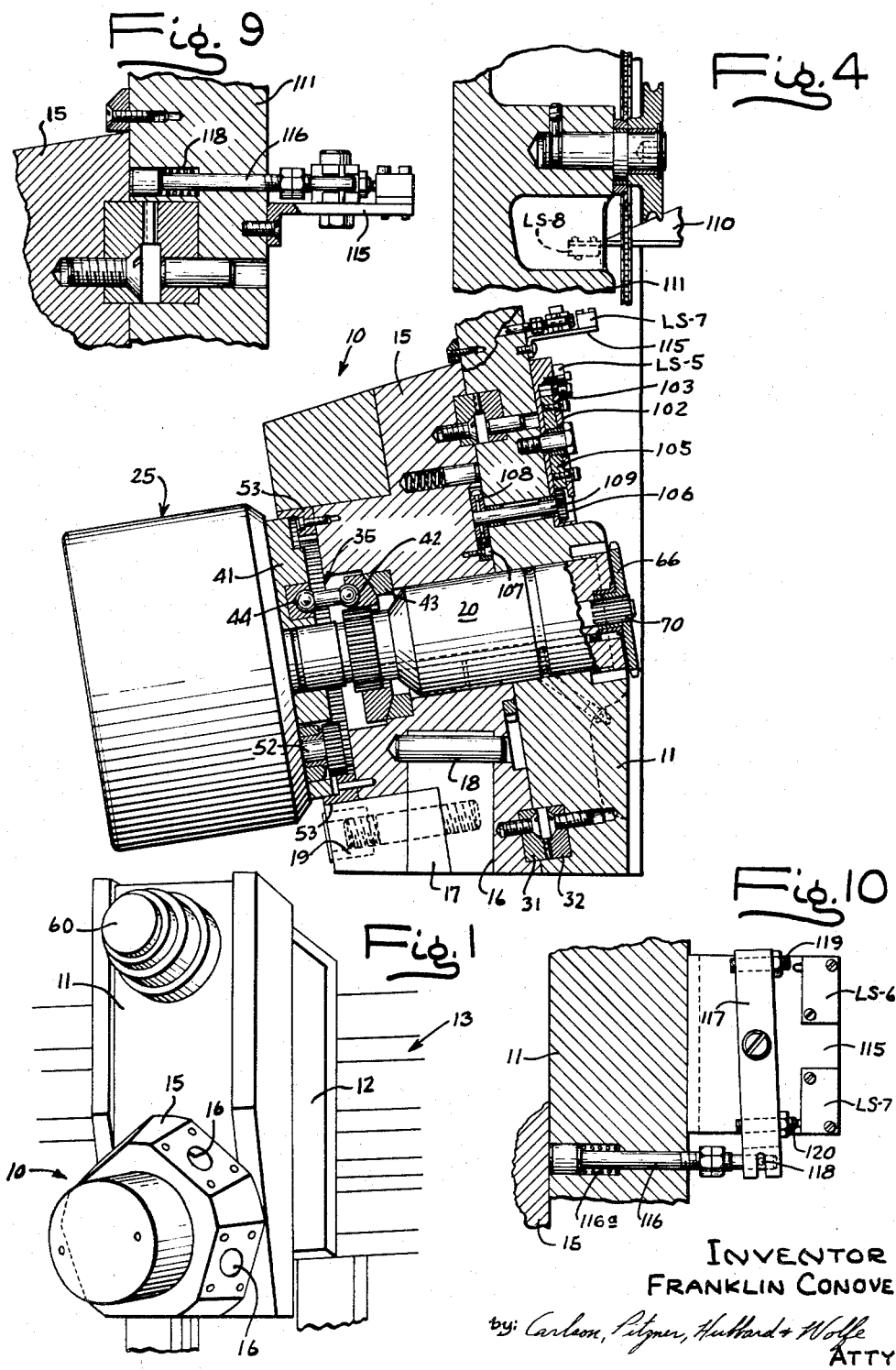
INVENTOR
FRANKLIN CONOVER
by: Carlson, Pitzner, Hubbard & Wolfe
ATTYS

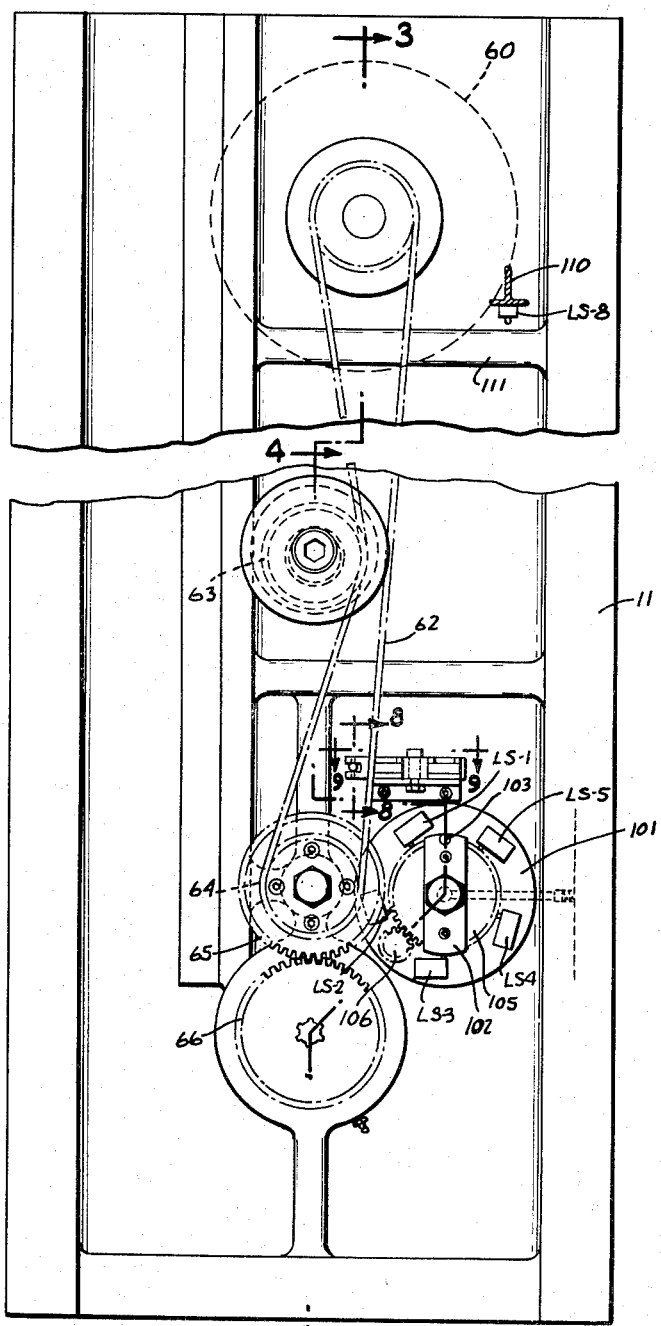

May 17, 1960 F. CONOVER 2,936,656
POWER TURRET FOR VERTICAL BORING MILL
Filed April 28, 1958 6 Sheets-Sheet 3
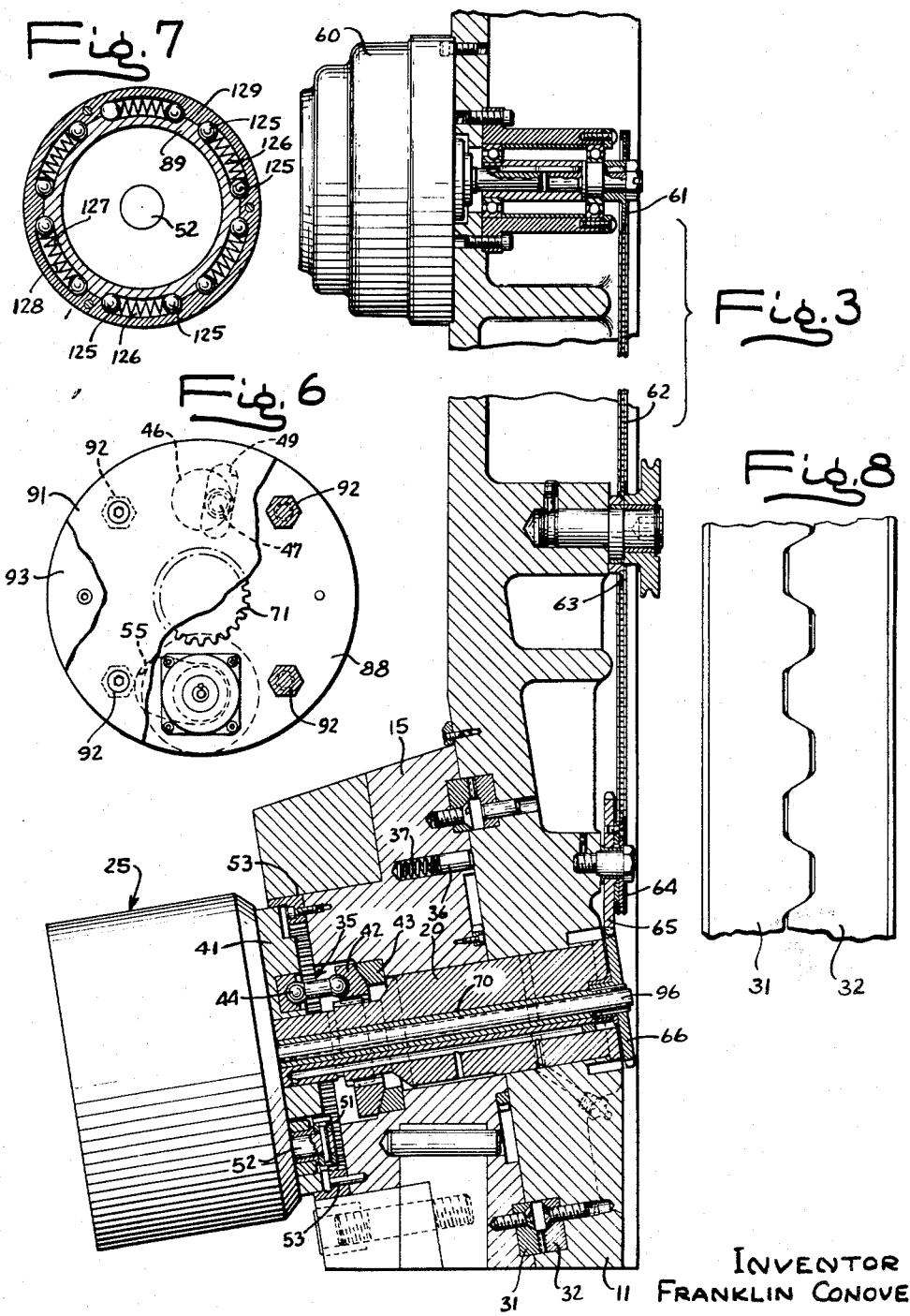
INVENTOR
FRANKLIN CONOVER
ATTYS.

May 17, 1960 F. CONOVER 2,936,656
POWER TURRET FOR VERTICAL BORING MILL
Filed April 28, 1958 6 Sheets-Sheet 4

INVENTOR
FRANKLIN CONOVER
by: Carlson, Pitzner, Hubbard + Wolfe
ATTYS.

May 17, 1960 F. CONOVER 2,936,656
POWER TURRET FOR VERTICAL BORING MILL
Filed April 28, 1958 6 Sheets-Sheet 5

INVENTOR
FRANKLIN CONOVER

ATTYS.

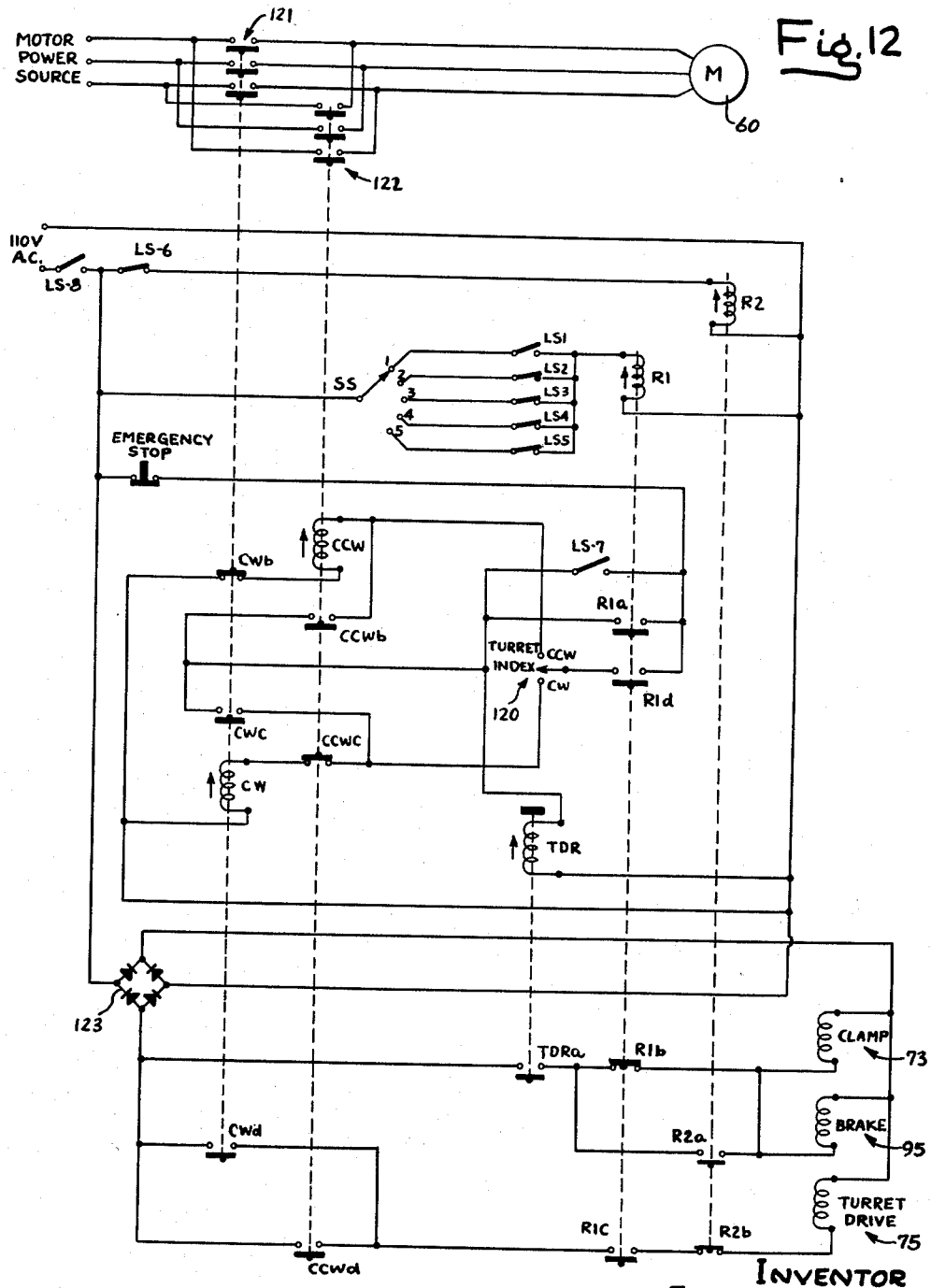

United States Patent Office 2,936,656
Patented May 17, 1960

2,936,656

POWER TURRET FOR VERTICAL BORING MILL

Franklin Conover, Fond du Lac, Wis., assignor to Giddings & Lewis Machine Tool Company, Fond du Lac, Wis., a corporation of Wisconsin Application April 28, 1958, Serial No. 731,551

10 Claims. (Cl. 74—826)

The present invention relates to a tool holding turret for a vertical boring mill or similar machine tool, and more particularly to a tool holding turret which is completely power operated.

The present application is a continuation-in-part of my application Serial No. 665,857, filed June 14, 1957, which was assigned to the present assignee.

It is the general aim of the invention to provide a tool holding turret having novel power operated devices for selectively unclamping, indexing and reclamping the turret at any desired angular position.

With greater particularity, it is an object of the invention to provide a power indexing turret which may be selectively positioned quite rapidly since the turret may be driven in either a clockwise or counterclockwise direction whichever is most direct, and will proceed uniformly to the desired position without intermittent pauses.

It is also an object to provide a power indexing turret having novel clamping means which will automatically clamp the turret into place when it reaches a desired angular position and will automatically unclamp the turret before it indexes to a new position. It is a collateral object to provide such a turret that is not clamped and released intermittently while being indexed, but is reclamped only when the final desired position is reached. It is a related detailed object to provide clamping means of the above type which are equally effective when driven by a motor rotating in either direction so that only a single motor is required for both indexing and clamping.

It is a further object to provide a turret of the above type having a power clamping device which is effective to mechanically lock the turret in any selected position without looseness or play.

It is another object to provide a turret of the type characterized above that is precisely positioned in each of its selected angular positions as an incident to being clamped so that the turret driving mechanism is not itself called upon to precisely locate the turret.

It is a detailed object to provide a turret having power indexing and clamping devices as described above in which power is provided through a high-speed, low-torque driving train up to the point where high torques are required, so that the turret and its power devices can be exceptionally light and compact without sacrificing desirable strength and sturdiness. It is a collateral object to provide a power operated turret whose power devices are located "out of the way" and yet are easily accessible for servicing and maintenance.

It is yet another detailed object to provide a power operated turret with electrically energized units such as clutches and brakes being non-rotatively mounted so that slip rings or the like need not be relied upon. It is an allied object to provide an electrical control system for a turret of the above described type that is completely enclosed with no external wiring.

Other objects and advantages of the invention will become apparent upon reading the attached detailed description and upon reference to the drawings in which:

Figure 1 is a perspective view of a power operated turret constructed in accordance with the present invention mounted as a part of a vertical boring mill, only a fragment of which is shown.

Fig. 2 is a rear view of the power operated turret and its supporting ram shown in Fig. 1.

Fig. 3 is a sectional view taken along the lines 3—3 of Fig. 2.

Fig. 4 is a sectional view taken along the line 4—4 in Fig. 2, which line angularly offsets to the right in that figure to include details of the control system.

Fig. 6 is a front elevation view of the turret drive mechanism shown in Fig. 5 with the outer cover plate broken away along one line and the end wall broken away along another line.

Fig. 7 is an elevation view of a resilient coupling incorporated in the turret drive mechanism shown in Fig. 5.

Fig. 8 is a fragmentary elevation view of the clamp coupling shown in section in Fig. 3.

Fig. 9 shows a vertical sectional view taken along line 8—8 in Fig. 2.

Fig. 10 is a horizontal sectional view taken along line 9—9 of Fig. 2.

Fig. 12 is a schematic wiring diagram showing a control circuit for the turret illustrated in Fig. 1.

Figure 5:
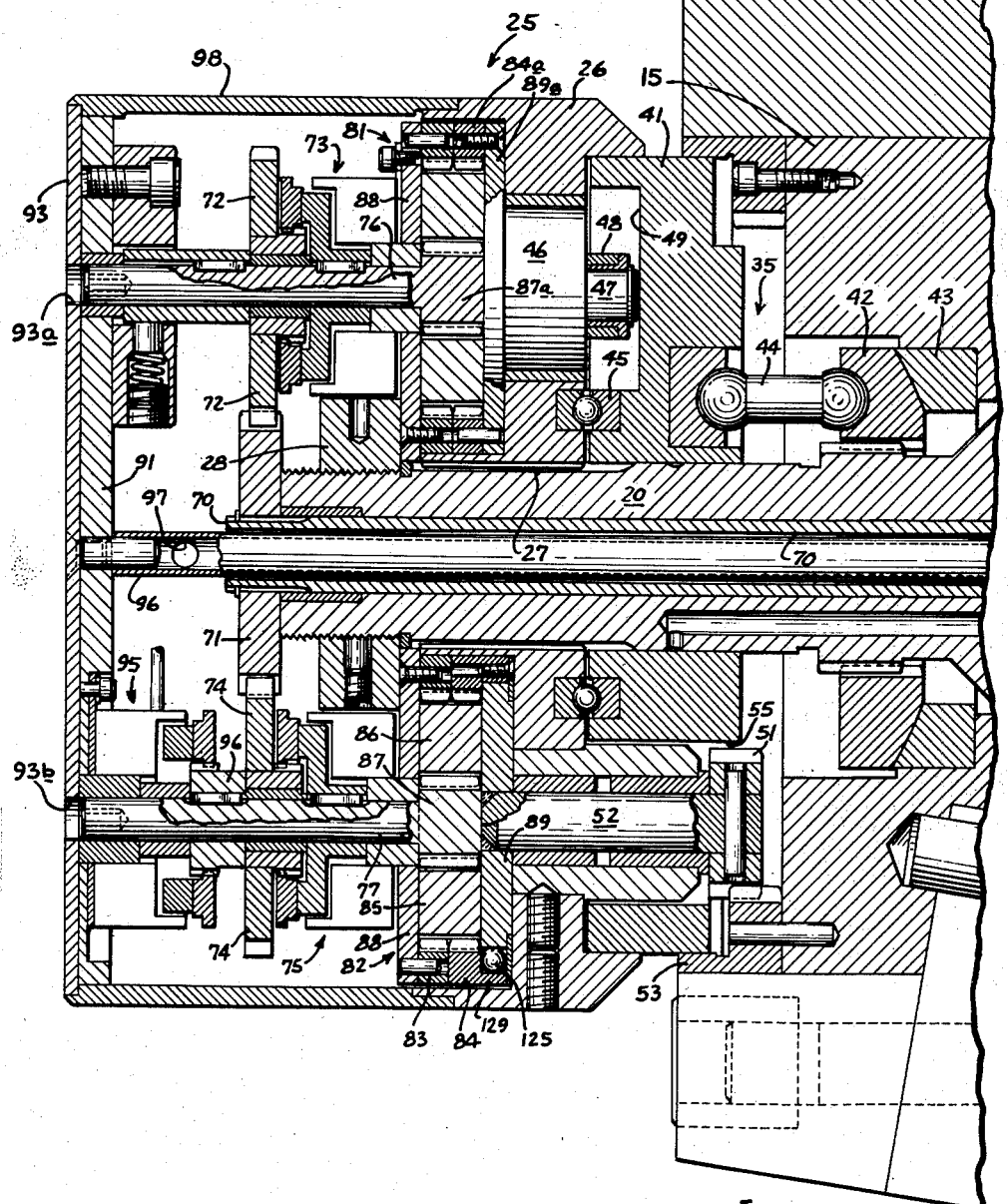
Fig. 5 is a longitudinal sectional view taken through the drive mechanism mounted on the front of the turret shown in Fig. 1.

While the invention will be described in connection with a preferred embodiment it will be understood that I do not intend to limit the invention to that embodiment. On the contrary, I intend to cover all alterations, modifications and equivalents that may be included within the spirit and scope of the invention as defined by the appended claims.

Turning first to Fig. 1, there is shown a tool supporting turret 10 constructed in accordance with the invention utilized in a vertical boring mill, the latter being only fragmentarily shown. As is conventional in such installations, the turret 10 is carried on a ram 11 which is mounted for vertical reciprocation on a saddle 12. The saddle 12, in turn, may be translated along a rail structure 13. The machine tool is provided with suitable means for raising and lowering the ram 11 on the saddle 12, and for translating the saddle 12 along the rail structure 13, as is conventional and well known to those skilled in this art.

The turret 10 comprises a flat-sided turret body 15 having a plurality of tool holding sockets 16 located about the periphery of the turret body. In order to lock individual tools within a socket 16, each socket is provided with a clamp 17 (see Fig. 4) and a pin 18 fixed at the bottom of the tool socket. The clamp 17 is operated by manipulating a nut 19, and the pin 18 engages a complementary tang on the shank of a tool to prevent rotation of the tool within the socket 16.

The turret body 15 is rotatably mounted on a spindle 20 which is fixed to the ram 11 and projects forwardly therefrom. It can thus be seen that the turret body 15 can be angularly indexed on the ram 11 so as to present a particular tool, carried by one of the sockets 16, in a working position.

Figure 11:
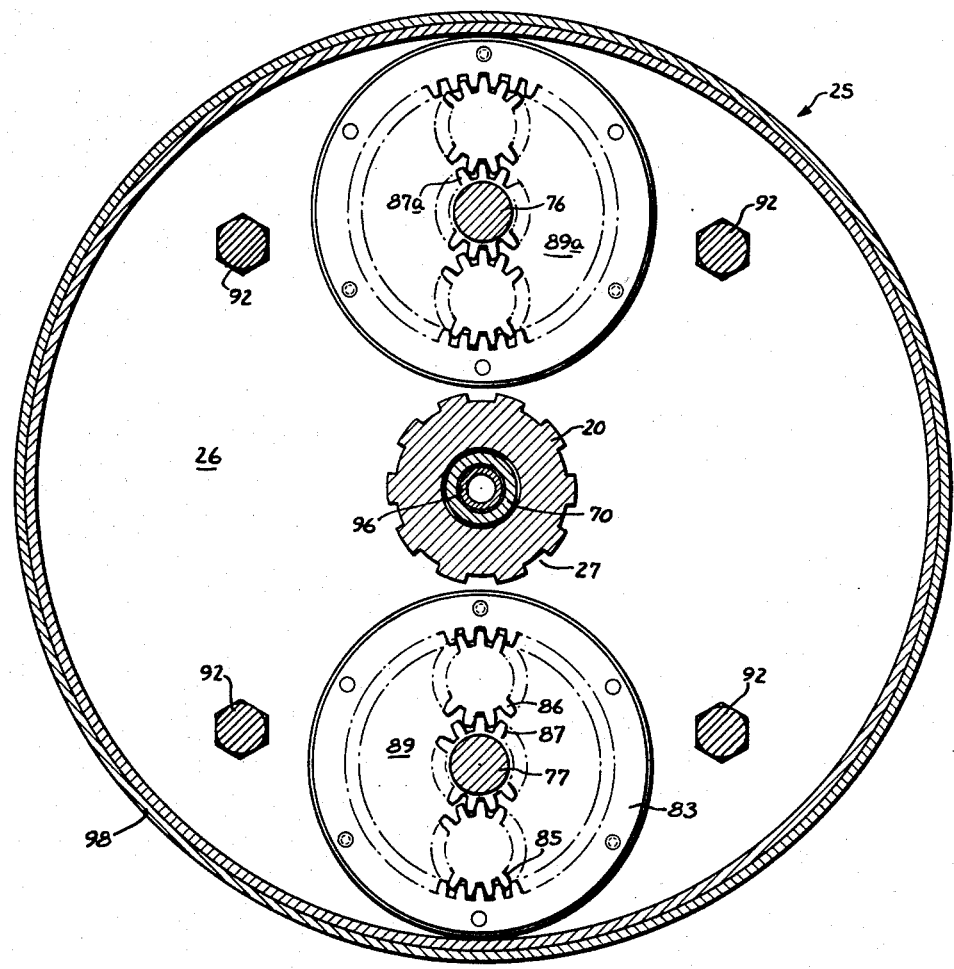
Fig. 11 is a sectional view taken along line 11—11 in Fig. 5.

Secured non-rotatably to the outer end of the spindle 20 is a turret operating assembly 25 which includes a main frame plate 26 (see Figs. 5 and 11). The frame plate 26 is splined to the spindle 20 at 27, and is locked into place by an annular nut 28 threaded onto the end of the spindle.

The turret 10 embodying the invention includes a clamping mechanism for locking and precisely locating the turret body 15 in any desired angular position, and which may be effectively operated by a driven shaft rotating in either a clockwise or counterclockwise direction. In the preferred embodiment, the clamping mechanism takes the form of an interengaging coupling, comprising two annular members 31, 32 each having fifty axially extending, tapered teeth which are brought into engagement by sliding the turret body 15 axially along the spindle 20 (see Figs. 3 and 8). The annular member 32 is fixed to the ram 11 and the annular member 31 is fixed to the rear face of the turret body 15. To permit the turret body 15 to slide axially along the spindle 20, sufficient clearance is provided between the ram 11 and the operating assembly 25. It will be understood that when the turret body 15 is moved outwardly along the spindle 20 until the members 31, 32 disengage, the turret body will be free to rotate about the spindle to any desired angular position.

In order to control the axial movement of the turret body along the spindle 20, and thus clamp or unclamp the turret, a toggle mechanism 35 and means to resiliently urge the turret body from the ram 11 are provided. In the illustrated embodiment, the latter means comprises a plurality of pins 36 seated within bores provided in the rear surface of the turret body 15 and which are urged outwardly by compressed coil springs 37 into pushing engagement with the ram 11. Preferably, there are five similar pins 36 and springs 37 spaced peripherally around the turret body. It can thus be seen that when the turret body is free to slide on the spindle 20, the pins 36 will push the turret body from the ram 11, separating the members 31, 32 and thus unlocking the turret body for rotation.

Turning now to the toggle mechanism 35 which is of a well known type, there is provided a clamp plate 41 rotatably mounted on the spindle 20 and a thrust ring 42 which is splined to the spindle 20 for movement axially but not rotatably thereto. The thrust ring 42 bears against a thrust bearing 43 secured to the turret body 15. Extending between the clamp plate 41 and the thrust ring 42, and seated within sockets provided thereon, are a plurality of toggles 44 evenly spaced about the periphery of the spindle 20. In the preferred embodiment, three such toggles are employed. The parts are proportioned so that when the toggles 44 are extended parallel to the spindle 20, the turret body 15 is urged against the ram 11 and the coupling members 31, 32 are in clamping engagement. However, when the clamp plate 41 is slightly rotated so as to tip the toggles 44 with respect to the spindle 20, the spring-urged pins 36 will be effective to slide the turret body 15 outwardly along the spindle 20, moving the thrust ring 42 along its splined connection, and thus separate the coupling members 31, 32 so that the turret body is free to rotate. In order to again clamp the turret body, the clamp plate 41 is angularly returned to its original position so as to straighten the toggles 44, thus forcing the thrust ring 42 inwardly along the spindle 20 and urging the turret body 15, in opposition to the resilient force of the pins 36, against the ram 11 and into clamped position.

In order to anchor and prevent axial movement of the clamp plate 41, a thrust bearing 45 (see Fig. 5) is interposed between the clamp plate and the main frame plate 26 of the operating assembly 25. It will be recalled that the frame plate is axially restrained on the spindle 20 by the nut 28, which is threaded onto the spindle and drawn up against the frame plate.

For the purpose of rotating the clamp plate 41 between its clamping and unclamping positions, a crank 46 is journaled in the frame plate 26 and is provided with an eccentric crank arm 47 which carries a roller 48. The crank arm 47 and roller 48 are received within a slot 49 formed in the outer surface of the clamp plate 41 (see Fig. 6). It will thus be apparent that rotation of the crank 46, in either direction, will cause the roller 48 to bear against a side of the slot 49 and rotate the clamp plate 41 from one angular limit position to another. The parts are proportioned and arranged so that one limit position of the clamp plate causes the turret body 15 to be fully clamped, and the other allows the turret body to move away from the ram 11 and be freely revolvable about the spindle 20.

As a further feature of the invention embodied in the turret 10, a drive mechanism is provided for rotating or indexing the turret when it is unclamped, in either direction according to the operator's wishes. In this way, the turret may be indexed directly to a desired angular position through the shortest distance, so that the turret need not be completely rotated through all of its possible positions before reaching the one desired. In the illustrated embodiment, the drive mechanism includes a pinion 51 that is secured to a drive shaft 52 journaled in the main frame plate 26, which is in driving engagement with a ring gear 53 mounted concentrically on the forward end of the turret body 15. The pinion 51 and gear 53 are proportioned so that adequate clearance is provided for the axial sliding movement of the turret body as it moves between its clamped and unclamped positions. It will be understood that rotation of the drive shaft 52, in either a clockwise or counterclockwise direction, will cause a similar indexing movement of the turret body 15 when it is unclamped and free to revolve on the spindle 20.

To permit the clamp plate 41 to rotate and thus clamp and unclamp the turret body 15 without interfering with the drive shaft 52, a slot 55 is formed in the clamp plate through which the shaft 52 and its connected pinion 51 may extend (see Figs. 5 and 6). The slot 55 is proportioned so that the journaled shaft 52 does not engage the clamp plate 41 when the latter shifts angularly about the spindle 20 to clamp and unclamp the turret body.

Structural provision is made for the turret 10 embodying the invention to be powered by a single reversible motor through a high-speed, low-torque driving train which extends to the point where high torques are required to operate the clamping and drive mechanisms. It will be appreciated that the use of a single reversible motor is made possible since the drive shaft 52 may be rotated in either direction, depending upon the motion of the turret body desired, and since the crank 46 is effective to clamp or unclamp the turret body whether driven in a clockwise or counterclockwise direction.

In the preferred embodiment, power for operating the turret 10 is provided by a reversible electric motor 60 mounted on the front face of the ram 11 (see Figs. 1 and 3). The output shaft of the motor 60 is directly coupled to a sprocket 61 which drives a chain 62 trained about an idler sprocket 63 and a driven sprocket 64 (see Fig. 2). The driven sprocket 64 is secured to a gear 65 which, in turn, is in meshing engagement with a gear 66 journaled concentrically with the spindle 20.

To transmit power to the operating assembly 25 from the gear 66, which is directly coupled to the motor 60, the spindle 20 is provided with a central bore which receives a main drive shaft 70 on which the gear 66 is splined (see Fig. 4). The main drive shaft 70 is hollow for a purpose which will be made clear below. The drive shaft 70 extends through the forward end of the spindle 20 and has a gear 71 splined to its forwardly projecting portion. The gear 71 is in driving engagement with both a gear 72, which is the input gear of an electric clutch 73, and a gear 74, which is the input gear of an electric clutch 75. Energization of the clutch 73 is effective to cause a clamp actuating shaft 76 to rotate with the gear 72, while energization of the electric clutch 75 is effective to cause a drive actuating shaft 77 to rotate with the gear 74.

It will be appreciated that up to the point thus far described, all of the elements of the driving train are, in effect, directly coupled with the motor 60 and are therefore rotated at the high output speeds of the motor. Due to their high speeds, sufficient power may be transmitted through these parts without creating high torque forces, and thus the parts can be kept small, and the entire arrangement can be quite compact without sacrificing required strength.

In order to convert the high-speed, low-torque power provided by the actuating shafts 76, 77 to the required low-speed, high-torque power needed for driving the crank 46 and the drive shaft 52, two planetary, speed-reduction units 81 and 82 are provided (see Figs. 5 and 11). Since these units are substantially identical, only the unit 82 will be described in detail, and it will be understood that the unit 81 is similarly constructed.

The unit 82 comprises two ring gears 83 and 84 which are both in mesh with floating planet pinions 85 and 86. The planet pinions 85, 86 are, in turn, driven by a sun gear 87 which is fixed to, and driven with, the drive actuating shaft 77. The ring gear 83 is secured against rotation to an annular plate 88 which closely surrounds the spindle 20 and is mounted on the main frame plate 26 in a manner described below, and the ring gear 84 is coupled to a disk 89 which is secured to the drive shaft 52.

To effect speed reduction, the ring gear 83 has fewer teeth than the ring gear 84. In this case, the ring gear 83 has 46 teeth while the gear 84 has 48 teeth. It can thus be seen that rotation of the sun gear 87 will produce a significantly slower and more powerful rotation of the ring gear 84 which is directly imparted to the drive shaft 52. In the preferred embodiment the ratio of gear reduction is 93 to 1.

In the unit 81, a sun gear 87a slowly rotates a ring gear 84a which is secured to a disk 89a carried by the crank 46. It can therefore be seen that rotation of the actuating shafts 76, 77 will produce slower, more powerful, corresponding rotation of the crank 46 and the drive shaft 52, respectively.

In order to completely arrest the indexing rotation of the turret body 15 following its movement to a desired angular position, an electric brake 95 is provided which, when energized, will lock rotation of a sleeve 96 that is keyed to the drive actuating shaft 77. The brake 95, as well as the clutches 73, 75, are conventional units of types commonly utilized and familiar to those skilled in the art.

To provide a forward support for the shafts 76, 77 and the structure associated therewith, the operating assembly 25 is provided with a front mounting plate 91 which is fixed in spaced relation to the frame plate 26 by four, peripherally positioned, posts 92 (see Figs. 6 and 11). The posts 92 are rigidly set in the frame plate 26 and extend forwardly through the end of the plate 88 to the front mounting plate 91. The four posts 92 and the plates 26, 88 and 91 form a rigid, cage-like frame structure for the assembly 25. To shield and protect the mechanism between the frame plate 26 and the mounting plate 91, a cylindrical housing cover 98 is provided which extends slightly forwardly of the front mounting plate 91 to receive a front cover plate 93. Thus, the cylindrical cover 98, the cover plate 93, and the frame plate 26, combine to form a smooth attractive outer housing for the operating assembly 25.

In order to energize the clutches 73, 75 and the brake 95 without providing external wiring, conductors for these units are passed through a conduit 96 disposed within the hollow main drive shaft 70. The conduit 96 is secured against rotation to the front mounting plate 91, and is provided with an access opening 97 (see Fig. 5) which permits electrical conductors from the clutches and brake to enter the conduit and pass through the center of the turret body 15 to the rear of the ram 11. It can be seen that this arrangement avoids any necessity for external wiring.

It is one of the important features of the invention embodied in the turret 10, that, in operation, the turret body 15 is precisely positioned as an incident to being clamped so that the drive mechanism is not called upon to precisely index the turret. In the illustrated embodiment, this is accomplished by forming the intermeshing teeth of the coupling members 31, 32 with tapering sides having a pronounced slope, and by providing a flexible coupling in the drive mechanism that rotates the turret body. As will be more fully explained below, when the turret body 15 has been indexed to a selected new position, the drive mechanism rotating the turret is immediately disengaged by deenergizing the clutch 75. Simultaneously, the brake 95 is energized to lock the turret in the position it has assumed. Although this operation is substantially instantaneous, the effects of turret body inertia and control circuit reaction time prevent precise angular adjustment of the turret body in this manner.

However, when the turret body is moved into its clamped position by rotating the clamp plate 41 and thus straightening the toggles 44, the teeth of the coupling members 31, 32, unless they are precisely alined, will be brought into engagement with their tapering sides in contact. Thus, the fixed member 32 will exert a camming force tending to angularly adjust the position of the turret body 15 until the teeth are exactly alined and the turret therefore precisely indexed. In this way, accurate angular positioning of the turret is accomplished to within very close tolerance.

When the turret body 15 is slightly rotated due to the camming effect of bringing the coupling members 31, 32, into full engagement, it will be appreciated that this rotational movement will be also imparted to the pinion 51 and the drive shaft 52 of the turret drive mechanism. In order to permit these elements to slightly rotate with respect to the other elements of the drive mechanism which are securely locked by the brake 95, a flexible coupling is interposed between the differential assembly 82 and the drive shaft 52. In the illustrated embodiment, the flexible coupling takes the form of a plurality of pairs of spring-urged balls 125, each separated by a compressed spring 126, which are disposed in arcuate chambers formed by the arcuate recesses 127 on the outer surface of the disk 89 and corresponding arcuate recesses 128 on the inner surface of an annular flange 129 formed on the ring gear 84 (see Figs. 5 and 7). Except for the effect of the balls 125 and the springs 126, the disk 89 is freely rotatable within the flange 129. When the balls and springs are in place, however, rotation of the ring gear 84 imposes a force on one ball of each set which tends to compress the springs 126, and the resilient force of the compressed springs is exerted through the other ball of each set to rotate the disk 89.

It will be understood that the resilient coupling permits relative rotation between the ring gear 84 and the disk 89 in either direction. Therefore, when the turret body 15 is moved into its clamped position and the interfitting teeth of the coupling members 31, 32 cause a slight adjusting rotational movement of the turret body in either direction, the resilient coupling will permit the pinion 51, drive shaft 52 and disk 89 to rotate slightly with the turret body 15, despite the fact that the remaining portions of the drive mechanism are locked by the energization of the brake 95.

It will also be understood that the driving and braking mechanisms are cushioned by the resilient coupling against the suddenly applied forces required to both start and stop the indexing rotation of the turret body 15.

Before considering the control circuit of the invention, it is desirable to first note the several limit switches provided for determining the positional status of the turret 10. In order to indicate when the turret body 15 has reached the desired angular position, a set of limit switches, LS1 to LS5, and means connecting the turret body and the limit switches are provided, so that the switches are selectively operated as the turret is indexed. In the preferred embodiment, the limit switches, LS1–LS5, are microswitches of conventional design and are peripherally spaced about an annular plate 101 which is fixed to the rear surface of the ram 11.

To operate the switches, a bar 102 is journaled concentrically with the plate 101 and is provided with an axially projecting roller 103 which when the bar rotates, is effective to engage and operate the actuators of the limit switches LS1 to LS5. In order to rotate the bar 102 in synchronism with the turret body 15, a gear 105, in meshing engagement with a pinion 106, is fixed to the journaled bar 102. The turret body 15 drives the pinion 106 through a ring gear 107 that is secured to the rear face of the turret body and is in meshing engagement with a gear 108 secured to a shaft 109 on which the pinion 106 is mounted (see Fig. 4). It can therefore be seen that annular rotation of the turret body 15 produces an equal and corresponding rotation of the bar 102, and it will be understood that the limit switches LS1 to LS5 are positioned about the axis of the bar 102 so that one switch is operated when one corresponding socket 16 on the turret body 15 is properly located in working position.

To prevent indexing of the turret 10 when the ram 11 is lowered and thus avoid the danger of a rotating tool striking the work, a limit switch LS8 is provided for making it impossible to index the turret 10 until the ram 11 has been raised to its uppermost position. The limit switch LS8 in the illustrated embodiment is mounted on a fixed bracket 110 (see Figs. 2 and 4) and is positioned to engage a reinforcing web 111 forming a part of the ram 11 when the latter is in its fully raised position. As will be made clear below, the limit switch LS8 must be operated by raising the ram before the control circuit is conditioned for operation.

For the purpose of indicating when the turret 10 is in its fully clamped position so that machine operation may be begun, or, conversely, is in its fully unclamped position so that it may be indexed, a pair of limit switches LS6 and LS7 are provided (see Figs. 4, 9 and 10). These switches are mounted on a bracket 115 which is secured to the rear face of the ram 11. In order to operate the switches LS6, LS7, a spring-biased plunger 116 is slidingly mounted in a hole bored in the ram 11 so as to resiliently bear against the rear face of the turret body 15. The rear of the plunger 116 is connected to the end of a centrally pivoted lever 117 by means of a pin and slot connection 118, so that when the turret body 15 moves against the ram 11 into its clamped position, the plunger 116 will be forced rearwardly and the lever 117 turned in a counterclockwise direction as seen in Fig. 10. When the turret body 15 moves outwardly into its unclamped position, a compressed spring 116a will urge the plunger 116 forwardly, whereupon the lever 117 will be pivoted in a clockwise direction. The lever 117 is formed with abutments 119 and 120 which are effective, respectively, to operate the switch LS6 when the turret is unclamped and the switch LS7 when the turret is clamped.

The control circuit for selectively positioning the turret 10 and which embodies the invention, is effective to operate the motor 60, the clutches 73, 75 and the brake 95 so as to unclamp the turret, index the turret body in either direction directly to the desired position without pausing, and automatically reclamp the turret in precisely the new position desired. In the preferred embodiment, the control circuit includes a multi-position selector switch SS for selecting the angular position to which it is desired to index the turret, and a clockwise or counterclockwise turret index switch 120 for causing the turret to move in a direction which, preferably, is the shortest way to reach the desired position. These switches are preferably a part of the pendant control station of the machine in which the turret 10 is employed, but can be suitably located wherever convenient.

Turning now to the preferred control circuit illustrated in Fig. 12, it will be seen that two motor control relays CW and CCW have been provided which are effective to energize the motor 60 through sets of contacts 121 and 122 respectively. When the relay CW picks up, the contacts 121 are closed and the motor 60 rotated in a direction to drive the turret body 15 in a clockwise direction. When the relay CCW is picked up, the contacts 122 are closed and the motor 60 is energized for rotation in a reverse direction, which will drive the turret body 15 in a counterclockwise direction.

When the turret 10 is to be indexed, the ram 11 is first raised until the switch LS8 is operated and its normally open contacts closed. Closing of these contacts completes a circuit through the normally closed contacts of the switch LS6, which are closed since the turret is not yet unclamped, to energize a control relay R2. Energizing relay R2 closes the normally open contacts R2a and opens the normally closed contacts R2b.

Next, the operator manually sets the selector switch SS to close the contacts corresponding to the angular position in which he wishes the turret 10 positioned. Setting of the switch SS connects one of the associated limit switches LS1–LS5 in circuit with a control relay R1. These limit switches have normally closed contacts which open when the switches are operated.

Thus, turning the selector switch SS from the position in which the turret is disposed, will complete a circuit through the then closed contacts of switch LS8 and the closed contacts of one of the unoperated switches LS1–LS5 so as to energize the relay R1. It will be assumed that it is desired to rotate the turret to its position number 1 and therefore the relay R1 will be energized by a circuit through switch LS8, position 1 of switch SS, and the then closed contacts of switch LS1.

Picking up of the relay R1 closes the contacts R1d so as to condition the turret index switch 120 for operation, and also closes the contacts R1a which completes a circuit through the Emergency Stop switch and the switch LS8 so as to energize a relay TDR. The relay TDR is of the time delay drop out type and its function will be described below.

The operator next selects the direction in which he wishes the turret to be indexed, preferably the shortest, most direct, route, and manually operates the turret index switch 120 to either its CW or CCW positions. Assuming that it is desired to index the turret in a clockwise direction, the turret index switch will be operated to close the contact CW which completes a circuit through the switch LS8 and the normally closed contacts of an Emergency Stop button switch to energize the motor control relay CW. When this relay picks up, the contacts 121 are closed to energize the motor 60 for rotation in the appropriate direction.

Picking up of the relay CW also closes the contacts CWc so as to seal-in the relay CW through a circuit including the normally closed contacts CCWc and the then closed contacts R1a. It can also be noted that when the relay CW is picked up, the contacts CWb are opened so as to avoid any possibility of energization of the alternative motor control relay CCW.

It will now be understood that all four relays, CW, R1, R2 and TDR, are initially energized, and it can be seen that the picking up of these relays will complete circuits from a rectifier 123 through normally open contacts TDRa and normally open contacts R2a for energizing both the clutch 73 and the brake 95. Energization of the clutch 73 causes the now rotating motor 60 to drive the crank 46 and thus unclamp the turret body 15, while energization of the brake 95 locks the drive shaft 52 against rotation and prevents the turret body from rotating as it is unclamped.

When the turret body is fully unclamped, the switch LS6 will be operated, through the plunger 116 and its associated mechanism, so as to deenergize the control relay R2. When this relay drops out, the contacts R2a will open and, it being remembered that the normally closed contacts R1b are now open, the brake 95 and the clutch 73 will be deenergized so that the turret body will be left unclamped and free to rotate. Also upon deenergization of the control relay R2, the normally closed contacts R2b will be again closed to complete a circuit through the then closed contacts R1c and CWd for energizing the clutch 75. Energizing the clutch 75 permits the still energized motor 60 to rotate the drive shaft 52 and thus index the turret body in the desired direction.

It will be understood that rotation of the turret body will continue uninterruptedly without pauses and without intermediate clamping operations until the limit switch which has been placed in circuit with the selector switch SS is operated. Upon operation of this limit switch which has been assumed to be LS1, the contacts of the limit switch will open to deenergize the control relay R1. When this relay drops out, the contacts R1a will be opened, but the sealed-in motor control relay CW will not be thereby deenergized. The control relay CW will remain sealed-in since the normally open contacts of the limit switch LS7 will then be closed, completing a circuit by-passing the contacts R1a and maintaining the motor control relay CW energized. The switch LS7 will be operated because the turret body 15 is then unclamped and the plunger 116 will contact the switch through the lever 117.

However, when the relay R1 drops out upon operating the switch LS1, the contacts R1c will open, thereby deenergizing the clutch 75 and immediately halting rotation of the turret body. Simultaneously, the contacts R1b will be closed to complete the circuit through the still closed contacts CWd and thus energize the clutch 73 and the brake 95.

The effect of deenergizing the relay R1 then, is to interrupt rotation of the turret body 15 and to brake the turret body to an immediate stop. Also, rotation of the crank 46 is immediately resumed so as to reclamp the turret head in its new position.

When the turret 10 reaches its fully clamped position, the switch LS7 is again operated, through the plunger 116, so that its contacts are opened and the motor control relay CW deenergized. When this relay drops out, the contacts 121 open to deenergize the motor 60. Operation of the switch LS7 also deenergizes the relay TDR, but since this relay is of the time delay type, it does not immediately drop out and thus the contacts TDRa remain closed for the delay period. In a practical case, the relay TDR may have a delay period of 0.5 second between the time it is deenergized and the time it drops out and opens the contacts TDRa.

By leaving the contacts TDRa closed for a short period after the turret head reaches its clamped position and the motor 60 is deenergized, the clutch 73 remains energized and the inertia of the motor 60 as it comes to a stop continues to drive the toggle mechanism 25. In this way, the inertia of the motor 60 is utilized to stress the turret head supporting and clamping structure so that the turret head is rigidly clamped in the selected position. The ram 11 may then be moved downwardly to carry the turret 10 into operating position, whereupon the switch LS8 is no longer operated so that its contacts open to entirely deactivate the control circuit.

It can be readily seen that moving the turret index switch 120 to the CCW position will energize the motor control relay CCW and the operation of the control circuit will be identical to that described above, with the exception that the motor 60 will be reversely energized so as to drive the turret body 15 in a counterclockwise direction. It will also be appreciated that pressing the Emergency Stop button will open the circuits to both motor control relays CW and CCW, and will therefore immediately deenergize the clutch 75 of the power mechanism as well as interrupt operation of the motor 60.

For the purpose of permitting manual operation of the turret without reliance upon the clutches 73, 75 and the associated control system, the front cover plate 93 is provided with a pair of apertures 93a and 93b in alinement with the shafts 76 and 77, respectively, and each shaft has an end formation permitting a tool to be inserted through the apertures into non-rotative engagement with the shafts. In this way the turret can be manually unclamped and indexed to an intermediate position between the angular positions determined by the limit switches LS1–LS5. It will also be appreciated that the turret can be manually clamped in as many as fifty angular positions since the coupling members 31, 32 are provided with fifty cooperating teeth as stated above. It can be readily seen that this provision for manual adjustment makes the turret quite flexible in meeting a wide variety of machinery operations.

I claim as my invention:

1. In a power operated machine tool, the combination comprising a rotatable turret having a plurality of sockets for supporting individual tools, a drive mechanism coupled to said turret for rotating the turret in either direction, clamping means for locking the turret in any angular position to which it has been rotated, means to selectively operate said drive mechanism for rotating said turret to any one of a predetermined plurality of angular positions, said means permitting the turret to be rotated in either direction so that the shortest distance to reach the desired position can be selected, and means for operating said clamping means in response to the operation of said drive mechanism so that the turret is automatically unlocked before rotation begins and again locked when the desired position is reached.

2. In a power operated machine tool, the combination comprising a rotatable turret having a plurality of sockets for supporting individual tools, a drive mechanism coupled to said turret for rotating the turret in either direction, a reversible motor coupled to said drive mechanism for powering the latter, clamping means for locking the turret in any angular position to which it has been rotated, a rotatable shaft for operating said clamping means, said clamping means being operable upon rotation of said shaft in either direction, means coupling said drive shaft to said motor for rotating the shaft, means to selectively operate said drive mechanism for rotating said turret to any one of a predetermined plurality of angular positions, said means permitting the turret to be rotated in either direction so that the shortest distance to reach the desired position can be selected, and means for operating said clamping means in response to the operation of said drive mechanism so that the turret is automatically unlocked before rotation begins and again locked when the desired position is reached.

3. In a power operated machine tool, the combination comprising a rotatable turret having a plurality of sockets for supporting individual tools, a drive mechanism coupled to said turret for rotating the turret in either direction, clamping means for locking the turret in any angular position to which it has been rotated, means for operating said drive mechanism continuously for a selected period and thus rotating said turret directly, without intermediate stops, to any one of a predetermined plurality of angular positions, and means for operating said clamping means in response to the operation of said drive mechanism so that the turret is automatically unlocked before rotation begins and again locked only after the desired position is reached.

4. A tool supporting turret head for use with a machine tool comprising, in combination, a supporting spindle, a turret body rotatably mounted on said spindle and having a plurality of sockets for supporting individual tools, a drive mechanism for rotating said turret body, means for selectively disabling said drive mechanism when the turret body rotates to any desired one of a plurality of angular positions, means for clamping the turret body against rotation, said clamping means having interfittting parts one of which being fixed and the other being carried by said turret body, said interfitting parts permitting clamping of the turret body only in precisely predetermined angular positions, said interfitting parts also being formed so that when they are brought into engagement for clamping the turret body they will adjust the angular position of the turret to the nearest one of said precise angular positions, and means to operate said clamping means when the drive mechanism is disabled so that the turret body will be clamped in a predetermined precise angular position.

5. A tool supporting turret head for use with a machine tool comprising, in combination, a supporting spindle, a turret body rotatably mounted on said spindle and having a plurality of sockets for supporting individual tools, a motor driven drive mechanism for rotating said turret body, means including a set of limit switches for selectively disabling said drive mechanism when the turret body rotates to any desired one of a plurality of angular positions, motor driven means for clamping the turret body against rotation, said clamping means having interfitting parts one of which being fixed and the other being carried by said turret body, said interfitting parts permitting clamping of the turret body only in precisely predetermined angular positions, said interfitting parts also being relatively tapered so that when they are brought into engagement for clamping the turret body they will cam the turret into the nearest one of said precise angular positions, and means to operate said clamping means when the drive mechanism is disabled by the selected one of said limit switches so that the turret body will be locked in a predetermined precise angular position.

6. A tool supporting turret head for use with a machine tool comprising, in combination, a supporting spindle, a turret body rotatably mounted on said spindle and having a plurality of sockets for supporting individual tools, a drive mechanism for rotating said turret body, means for selectively disabling said drive mechanism when the turret body rotates to any desired one of a plurality of angular positions, an interlocking coupling for clamping the turret body against rotation, said coupling including two annular members having a plurality of tapered, axially extending, interfitting teeth, one of said members being fixed and the other being mounted for rotation with the turret body, and means for axially engaging said members when the drive mechanism is disabled, said tapered teeth being effective to angularly adjust the position of the turret body when they are brought together as an incident to their interengagement so that the turret body is precisely positioned when clamped following rotation into a selected angular position.

7. A tool supporting turret head for use with a machine tool comprising, in combination, a supporting spindle, a turret body rotatably mounted on said spindle and having a plurality of sockets for supporting individual tools, a motor driven drive mechanism for rotating said turret body, means including a set of limit switches for selectively disabling said drive mechanism when the turret body rotates to any desired one of a plurality of angular positions, an interlocking coupling for clamping the turret body against rotation, said coupling including two annular members having a plurality of tapered, axially extending, interfitting teeth, one of said members being fixed and the other being mounted for rotation with the turret body, means for axially engaging said members when the drive mechanism is disabled by the selected one of said limit switches, said tapered teeth being effective to angularly adjust the position of the turret body when they are brought together as an incident to their interengagement so that the turret body is precisely positioned when clamped following rotation into a selected angular position, and a resilient coupling in said drive mechanism so that the mechanism will not interfere with said angular adjustment incident to clamping of the turret body.

8. A tool supporting turret head for use with a machine tool comprising, in combination, a hollow supporting spindle, a turret body rotatably mounted on said spindle having a plurality of sockets for supporting individual tools, a frame fixed to the outer end of said spindle, a drive shaft extending through said spindle to said frame, an indexing mechanism mounted on said frame for rotating said turret body to any selected one of a plurality of angular positions, a clamp and actuating mechanism therefor mounted on said frame for locking and unlocking said turret body against rotation in any one of said plurality of angular positions, two speed-reducing units mounted on said frame so that one is adjacent said indexing mechanism and the other adjacent said clamp actuating mechanism, said units being connected for operating their respective adjacent mechanisms, and said drive mechanism being coupled to said units through selectively operable clutches.

9. A tool supporting turret head for use with a machine tool comprising, in combination, a hollow supporting spindle, a turret body rotatably mounted on said spindle having a plurality of sockets for supporting individual tools, a frame fixed to the outer end of said spindle, a hollow drive shaft extending through said spindle to said frame, an indexing mechanism mounted on said frame for rotating said turret body to any selected one of a plurality of angular positions, a clamp and actuating mechanism therefor mounted on said frame for locking and unlocking said turret body against rotation in any one of said plurality of angular positions, two speed-reducing units mounted on said frame so that one is adjacent said indexing mechanism and the other adjacent said clamp actuating mechanism, said units being connected for operating their respective adjacent mechanisms, said drive mechanism being coupled to said units through electrically operated clutches, and a control circuit for said clutches having conductors extending through said hollow drive shaft and to said clutches.

10. In a power operated machine tool, the combination comprising a rotatable turret having a plurality of sockets for supporting individual tools, a drive mechanism including a motor coupled to said turret for rotating the latter, clamping means for locking the turret in any angular position to which it has been rotated, means including a clutch for coupling said motor to said clamping means so as to operate the latter, means to selectively operate said drive mechanism for rotating said turret to any one of a predetermined plurality of angular positions, and means for operating said clutch in response to operation of said drive mechanism so that the turret is unlocked before rotation begins and again locked when the desired position is reached, said last named means including means for continuing operation of said clutch after the turret is locked in the desired position and said drive mechanism motor is shut off so that the inertia of said drive mechanism and motor will be effective to rigidly lock said turret without looseness or slack.

References Cited in the file of this patent

UNITED STATES PATENTS 2,358,503     Godfriaux            Sept. 19, 1944